United States Patent
Vincent

(10) Patent No.: US 9,503,845 B2
(45) Date of Patent: Nov. 22, 2016

(54) IMAGE CUSTOMIZATION TO ENHANCE TRANSACTION EXPERIENCE

(71) Applicant: PAYPAL, INC., San Jose, CA (US)

(72) Inventor: Sundar Amalan Vincent, San Jose, CA (US)

(73) Assignee: PAYPAL, INC., San Jose, CA (US)

(\*) Notice: Subject to any disclaimer, the term of this patent is extended or adjusted under 35 U.S.C. 154(b) by 278 days.

(21) Appl. No.: 14/255,840

(22) Filed: Apr. 17, 2014

(65) Prior Publication Data
US 2015/0304806 A1 Oct. 22, 2015

(51) Int. Cl.
| | |
|---|---|
| *G06F 3/048* | (2013.01) |
| *H04W 4/02* | (2009.01) |
| *G09G 5/377* | (2006.01) |
| *G09G 5/36* | (2006.01) |
| *G06Q 30/06* | (2012.01) |
| *G06Q 30/02* | (2012.01) |

(52) U.S. Cl.
CPC .............. *H04W 4/02* (2013.01); *G09G 5/363* (2013.01); *G09G 5/377* (2013.01); *G06Q 30/0261* (2013.01); *G06Q 30/0269* (2013.01); *G06Q 30/0601* (2013.01); *G06Q 30/0641* (2013.01); *G09G 2320/08* (2013.01); *G09G 2354/00* (2013.01)

(58) Field of Classification Search
CPC .............. G06F 3/017; G06F 3/048–3/04842; G06F 17/30035–17/30899; G06Q 30/00–30/0643
See application file for complete search history.

(56) References Cited

U.S. PATENT DOCUMENTS

| | | | | |
|---|---|---|---|---|
| 2007/0138268 A1* | 6/2007 | Tuchman | ............... | G06Q 30/02 235/383 |
| 2010/0167712 A1* | 7/2010 | Stallings | ............... | G06F 3/0485 455/418 |
| 2012/0297309 A1* | 11/2012 | Robb | ..................... | G06Q 30/00 715/738 |
| 2013/0155107 A1* | 6/2013 | Ashour | ................ | G06T 19/006 345/633 |
| 2014/0058825 A1* | 2/2014 | Raman | .................. | G06Q 30/02 705/14.42 |

\* cited by examiner

*Primary Examiner* — Claudia Dragoescu
(74) *Attorney, Agent, or Firm* — Haynes and Boone, LLP

(57) ABSTRACT

Systems and methods according to one or more embodiments enhance a user's transaction experience. In an embodiment, a system includes a computer memory storing a user profile. The system also includes a computer processor operatively coupled to the computer memory. The computer processor is configured to perform the following operations: determining a location of a user associated with a user device; and automatically changing an image displayed on the user device based on the location of the user associated with the user device and data determined or inferred based on, at least in part, data comprising the user profile.

20 Claims, 6 Drawing Sheets

IMAGE CUSTOMIZATION TO ENHANCE TRANSACTION EXPERIENCE

BACKGROUND

Embodiments of the present disclosure generally relate to transactions and, more particularly, to methods and systems for image customization to enhance the transaction experience.

A customer regularly engages in transactions online or at a seller's business location. At times, the customer uses a transaction card, cash, or a mobile device for payment. Although the consumer may enter into a transaction, for example, purchase one or more desired items online or at the seller's business location, the consumer may not know of other opportunities for a purchase. For example, the consumer may not know where to find a particular item, or that other desirable items even exist. This may result in lost sales for sellers and missed opportunities for consumers.

BRIEF DESCRIPTION OF THE DRAWINGS

Like reference numerals are used to identify like elements illustrated in one or more of the figures, wherein showings therein are for purposes of illustrating embodiments of the present disclosure and not for purposes of limiting the same.

Figure 1:
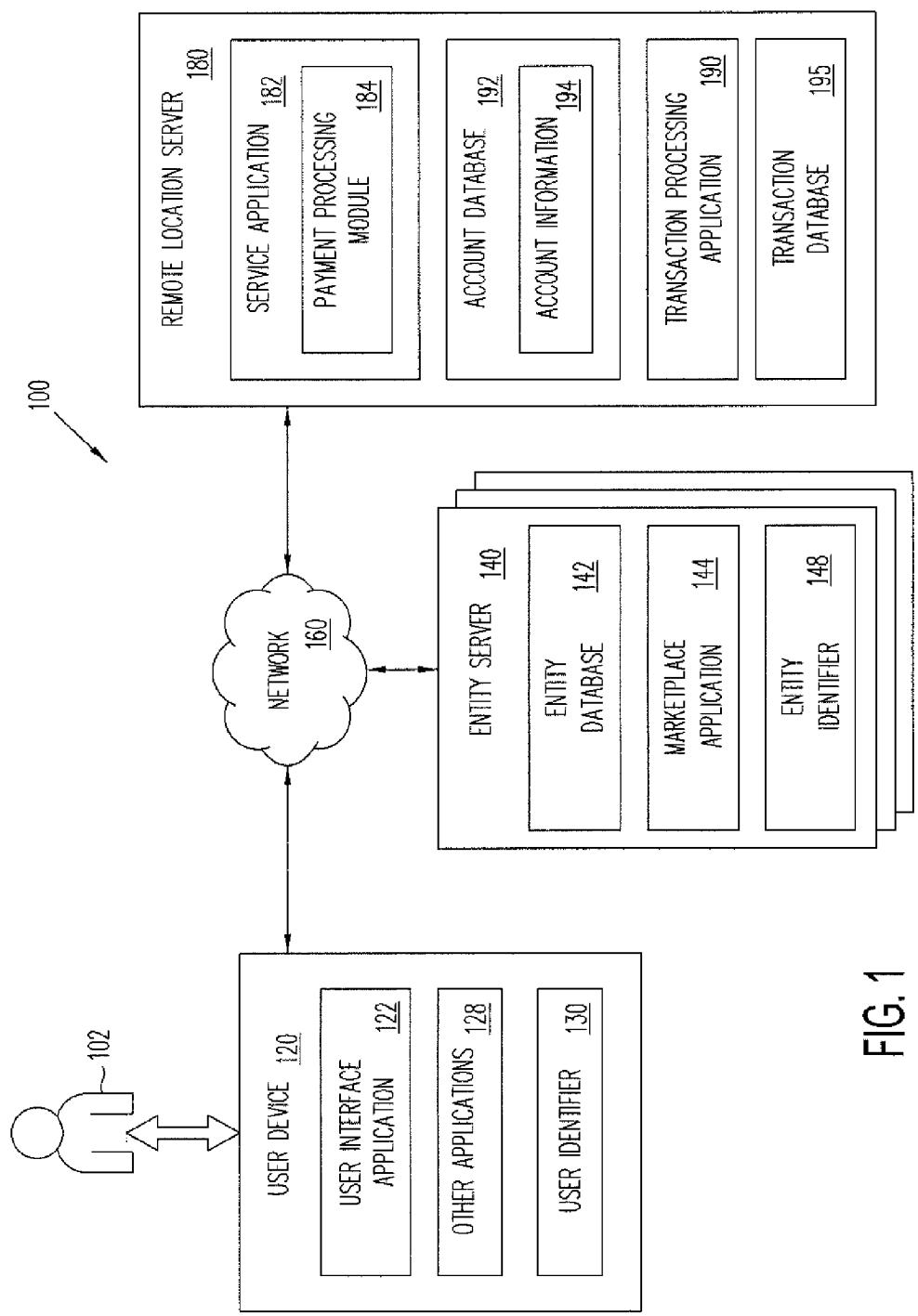
FIG. 1 is a block diagram illustrating a system for automatic image customization to enhance the transaction experience according to an embodiment of the present disclosure.

Embodiments of the disclosure and their advantages are best understood by referring to the detailed description that follows.

DETAILED DESCRIPTION

According to one or more embodiments of the present disclosure, methods and systems are provided for automatically changing or customizing an image to enhance a user's transaction experience. In one or more embodiments, an application may be downloaded on a user device, wherein the application may automatically change or customize images displayed on the user device. In that regard, an image such as a picture of a user, an avatar, a picture of an item or a landscape, a background picture, a picture of a model, etc., may be changed or customized based on information or data such as the geo location of the user, data about the user that may be inferred or determined based on, for example, a user profile including the user's preferences or tastes, the user's previous transaction data or behaviors, etc., as well as environmental data, background data, location data, and/or any other type of pertinent information or data related to the user, the background, the environment, the location, and/or the transaction. The automatically customized images may help users to imagine themselves, an item, or a surrounding background according to the user's data (e.g., with the user's preferences), which may potentially increase transaction opportunities. In an embodiment, the application may be provided by a remote server, for example a payment provider server such as PayPal® or eBay® of San Jose, Calif., USA.

In one or more embodiments, a user associated with a user device may be detected entering a seller's place of business, for example, by geo location services, by the user checking in into the place of business via a social network site on the user device, by using beacons or Bluetooth Low Energy (BLE), by mobile check-in through a user's mobile computing device, and/or by any other appropriate ways for detecting or determining a user's location. An image of the user such as a photograph or an avatar displayed on the user device may automatically change or be customized to help the user's purchasing experience. That is, an image such as an avatar or a photograph of the user may automatically change or be customized based on the geo location of the user, data inferred or determined based on, for example, the user's profile including the user's preferences or tastes, previous purchases, user searches, user-entered data, etc.

In an embodiment, the automatically-customized image may help the user imagine an item according to the user's preferences, for example, it may help the user imagine himself or herself having or wearing the item with the right preferences of the user. For example, if the user is entering a place of business such as a clothing store, the latest fashion styles may automatically appear or be overlaid on the avatar or picture of the user, along with options for customization, taking into account user data such as data inferred or determined about the user based on a user profile including user preferences or tastes, previous purchases, etc. In an instance, as the user enters the clothing store, the avatar or picture on the user device may automatically change to show an overlay of a shirt by a certain designer on the avatar or picture. Based on the user's profile, the shirt may be from the user's favorite designer, and/or it may be in the user's favorite color or pattern, for example. The automatically changed or customized image helps the user to imagine himself or herself in the shirt, which may meet the user's preferences and may encourage the user to purchase the shirt.

In another example, if the user is entering an eyeglass store, or is located near the eyeglass store, an image on the user device may automatically display the avatar or a picture of the user wearing cool sunglasses, or just a picture of cool sunglasses. In this example, other data may be taken into account including, for example, environmental data such as the weather at the time, the time of year, the time of day, etc.

The customized image on the user device may help the user to imagine a certain item with the right preferences, which may encourage the user to conduct a transaction associated with the item, for example purchase the item, at the present business location or at a nearby location. Information such as details or options related to the item (e.g., materials, provenance or origin, availability, etc.) and/or locations of other nearby sellers of the item may also be provided.

Advantageously, embodiments of methods and systems herein may provide the user with opportunities that enhance the transaction experience as well as increase sales for the seller.

Referring now to the drawings wherein the showings are for purposes of illustrating embodiments of the present disclosure only, and not for purposes of limiting the same, FIG. 1 illustrates a block diagram of a system for automatic image customization to enhance the transaction experience according to an embodiment of the present disclosure.

FIG. 1 shows an embodiment of a block diagram of a system 100 adapted to automatically change or customize images displayed on a user device 120 based on data such as geo location data, user data, background data, etc. As shown in FIG. 1, the system 100 includes at least one user device 120 (e.g., network computing device), one or more entity servers or devices 140 (e.g., network server devices), and at least one remote location server or device 180 (e.g., network server device) in communication over a network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, entity servers or devices 140, and remote location server or device 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In various examples, the user device 120 may be implemented as a wireless telephone (e.g., cellular or mobile smart phone), a tablet, a personal computer, a notebook computer, a wearable computing device, and/or various other generally known types of wired and/or wireless computing devices.

The user device 120, in one embodiment, includes a user interface application 122, which may be utilized by a user 102 to conduct transactions (e.g., shopping, purchasing, bidding, etc.) with the entity server or device 140 or with the remote location server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the remote location server 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access entity websites via the one or more entity servers 140 to view and select applications, products, and/or services ("items") for purchase, and the user 102 is able to purchase items from the one or more entity servers 140 via the remote location server 180. Accordingly, in one or more embodiments, the user 102 may conduct transactions (e.g., purchase and provide payment for one or more items) from the one or more entity servers 140 via the remote location server 180.

The user device 120, in various embodiments, may include other applications 128 as may be desired in one or more embodiments of the present disclosure to provide additional features available to user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, the user interface application 122 or the other applications 128 may include an application that may be loaded on user device 120 by remote location server 180 or by any other appropriate entity. The application enables an image displayed on a user device to automatically be changed or customized based on user location data, data that may be determined or inferred based on, for example, at least a user profile, background data, environmental data, etc. In one or more embodiments, user 102 may complete a transaction such as making payments to the appropriate entity via remote location server 180, wherein remote location server 180 may be, for example, a payment service provider.

The user device 120, in one embodiment, may include at least one user identifier 130, which may be implemented, for example, as operating system registry entries, cookies associated with the user interface application 122, identifiers associated with hardware of the user device 120, or various other appropriate identifiers. The user identifier 130 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 130 may be passed with a user login request to the remote location server 180 via the network 160, and the user identifier 130 may be used by the remote location server 180 to associate the user 102 with a particular user account maintained by the remote location server 180.

The one or more entity servers 140, in various embodiments, may be maintained by one or more sellers or business entities (or in some cases, by a partner of a business entity that processes transactions on behalf of business entities). Examples of sellers or businesses entities include stores, restaurants, hotels, gyms, or any other merchants or vendors of applications, products or services ("items"), which offer the various items for purchase and payment. In some embodiments, business entities may need registration of the user identity information as part of offering the items to the user 102 over the network 160. It should be appreciated that although a user-entity transaction is illustrated in this embodiment, the system may also be applicable to user-user, entity-entity and/or entity-user transactions.

Each of the entity servers 140, in one embodiment, may include a marketplace application 144, which may be configured to provide information over the network 160 to the user interface application 122 of the user device 120. For example, the user 102 may interact with the marketplace application 144 through the user interface application 122 over the network 160 to search and view various items available for purchase in the entity database 142.

Each of the entity servers 140, in one embodiment, may include at least one entity identifier 148, which, may be associated or be included as part of the one or more items made available for purchase so that, e.g., particular items are associated with particular entities. In one implementation, the entity identifier 148 may include one or more attributes and/or parameters related to the entity, such as business and banking information. In various embodiments, user 102 may conduct transactions (e.g., searching, selection, monitoring, purchasing, and/or providing payment for items) with each entity server 140 via the remote location server 180 over the network 160.

In various embodiments, entities associated with entity servers 140 may integrate their respective entity database 142 with a database maintained at remote location server 180, for example, an entity may provide the remote location server with data related to the latest items (e.g., the latest Spring designs) available and offered for transactions. In that regard, the various entities may provide data related to the items, upload the data, identify the data for or from a website, etc. In an example, a merchant may upload inventory including pictures and item details, or new products into its entity database 142, which may be integrated with a database maintained at remote location server 130.

The remote location server 180, in one embodiment, may be maintained by a transaction processing entity, which may provide processing for financial transactions and/or information transactions between the user 102 and one or more of the entity servers 140. As such, the remote location server 180 includes a service application 182, which may be adapted to interact with each user device 120 and/or each entity server 140 over the network 160 to facilitate the searching, selection, purchase, and/or payment of items by the user 102 from one or more of the entity servers 140. In one example, the remote location server 180 may be provided by PayPal®, Inc., eBay® of San Jose, Calif., USA, and/or one or more financial institutions or a respective intermediary that may provide multiple point of sale devices at various locations to facilitate transaction routings between entities and, for example, financial institutions.

The service application 182, in one embodiment, utilizes a payment processing module 184 to process purchases and/or payments for financial transactions between the user 102 and each of the entity servers 140. In one implementation, the payment processing module 184 assists with resolving financial transactions through validation, delivery, and settlement. As such, the service application 182 in conjunction with the payment processing module 184 settles indebtedness between the user 102 and each of the entities 140, wherein accounts may be directly and/or automatically debited and/or credited of monetary funds in a manner as accepted by the banking industry.

The remote location server 180, in one embodiment, may be configured to maintain one or more user accounts and entity accounts in an account database 192, each of which may include account information 194 associated with one or more individual users (e.g., user 102) and entities (e.g., one or more entities associated with entity servers 140). For example, account information 194 may include private financial information of each user 102 and each entity associated with the one or more entity servers 140, such as one or more account numbers, passwords, credit card information, banking information, or other types of financial information, which may be used to facilitate financial transactions between the user 102 and the one or more entities associated with the entity servers 140. In various aspects, the methods and systems described herein may be modified to accommodate users and/or entities that may or may not be associated with at least one existing user account and/or entity account, respectively.

In one implementation, the user 102 may have identity attributes stored with the remote location server 180, and the user 102 may have credentials to authenticate or verify identity with the remote location server 180. User attributes may include personal information that may include an image such as a photograph or an avatar of the user, banking information and/or funding sources as previously described. In various aspects, the user attributes may be passed to the remote location server 180 as part of a login, search, selection, purchase, and/or payment request, and the user attributes may be utilized by the remote location server 180 to associate the user 102 with one or more particular user accounts maintained by the remote location server 180.

A transaction processing application 190, which may be part of payment processing module 184 or separate, may be configured to receive information from one or more user devices such as user device 120 and/or one or more entity servers such as entity server 140 for processing and storage in a transaction database 195. Transaction processing application 190 may include one or more applications to process information from users such as user 102 for processing an order and payment through one or more entities as described herein. As such, transaction processing application 190 may store details of an order associated with transactions between one or more entities and a user. Payment processing module 184 may be further configured to determine the existence of and to manage accounts for user 102, as well as create new accounts if necessary.

Transaction database 195 may store transaction information from completed transactions, including authorization details and/or details of the transactions. Details of a transaction may include a description of items involved in a transaction such as services rendered or products purchased (e.g., colors, sizes, brands, etc.), total costs, locations, dates, forms of payment, co-payment amounts (if any), etc. Such information may also be stored in a third party database accessible by the remote location server provider and/or the entity server.

The system 100 described above with respect to the embodiment of FIG. 1 may be used for gathering and recording information about users' experiences, preferences and costs in connection with transactions with one or more entities. Such information may be recorded or stored in a user profile or database, for example, transaction database 195 of remote location server 180 and/or, in some embodiments, in entity database 142 of entity server 140. In an example, an application downloaded and installed on a user device may gather and store information about a user's experiences or preferences for specific types of items, for example, preferences in clothes, colors, sizes, styles, brands, etc. Information about the user's experiences may also include, for example, information on how the user liked the services, the quality of the services, cleanliness of a facility, customer service, etc. As such, information may be gathered and stored in a user profile, for example, in transaction database 195, in connection with transactions with one or more entities such that an application may provide automatic image customization based on data determined or inferred based on, at least the user profile including the user's experiences or preferences. Advantageously, the user may have enhanced transaction experiences while potentially increasing sales for the entities.

Figure 2:
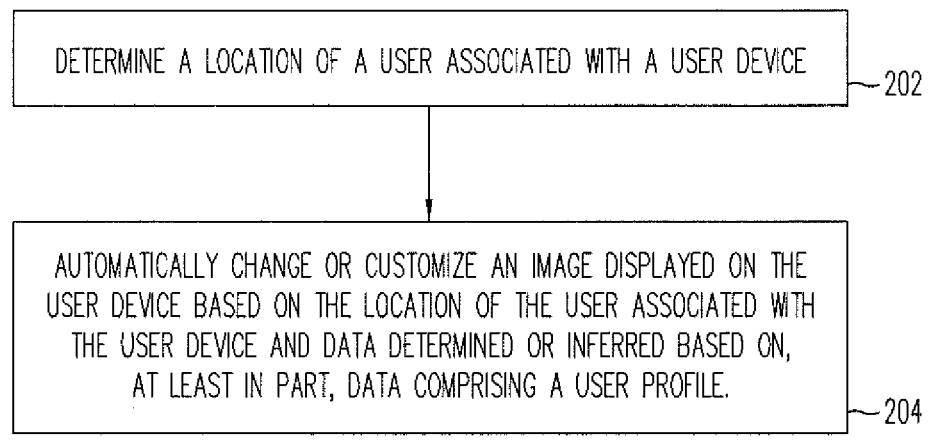
FIG. 2 is a flow diagram illustrating a method for automatically changing or customizing an image to enhance the transaction experience according to an embodiment of the present disclosure.

Referring now to FIG. 2, a flow diagram illustrates a method for automatically changing or customizing an image to enhance the transaction experience according to an embodiment of the present disclosure. In various embodiments, the method illustrated in FIG. 2 may be implemented by the system illustrated in the embodiment of FIG. 1.

In block 202, the location of a user associated with a user device may be determined. In an embodiment, the location may be determined via geo location services. For example, the user may be detected as entering into a seller or business location or as being near (e.g., within 50 feet, 100 feet, 150 feet, etc.) the business location such as a store, a restaurant, a hotel, a gym, etc. In another embodiment, the location may be determined by the user checking in into an entity associated with the location. For example, the user may check in into a store when the user enters the store via a social networking site, or the user may check in through an application on a mobile device of the user, or through a beacon (via BLE) in or near the store.

In block 204, an image displayed on the user device may be automatically changed or customized based on the location of the user associated with the user device and data determined or inferred based on, at least in part, data comprising a user profile.

In various embodiments, data comprising a user profile may be maintained, for example, at transaction database 195 illustrated in the embodiment of FIG. 1. The user profile may include information or data associated with the user such as user preferences, tastes, previous purchases, user searches, user-entered data, etc. In that regard, the user profile may include historical transaction data that may be used for determining the user's preferences or other information about the user. In one or more embodiments, the information in the user profile may be weighted differently to obtain a final decision on whether to make a specific recommendation to a user by way of customizing an image with an item. A user's weight for a particular attribute of an item may be determined in any number of ways, including behavior of the user. For example, purchases may be weighted more than searches. Items closer in price with the user's previous purchases may be weighted more than more expensive items. The closeness of an item to a preference, such as color, may be weighted accordingly. As such, an individual user may have a user profile (which may be implemented in transaction database 195 illustrated in FIG. 1) that includes user-specific weighting for item attributes and data. In many cases there may be direct evidence that a user likes a specific item attribute (for example, purchased multiple pairs of brown shoes), but in other cases the evidence may be indirect (for example, might like brown slacks since user likes brown shoes). The user's profile may change continually with new actions by the user. It should be noted that a recommendation by way of changing or customizing an image may be for an item that may or may not be specifically requested or sought by the user. In one embodiment, before a recommendation is made as may be implemented in a customized image, systems and methods according to one or more embodiments herein may analyze recent user behavior and/or previous purchases, environmental data such as time of year, weather, etc., availability, strength of match, background data (e.g., a background location such as an interior of a hotel room, a garden, etc.), and other pertinent information.

In an example, based on a geo location of a user device indicating that a user of the user device is entering a clothing store, an image such as a picture, avatar, etc. may change to help the user with his or her buying experience. For instance, as the user is detected to be entering the clothing store, the latest styles or inventory may automatically appear on the image, based on the user profile including user's preferences or tastes, previous purchases, etc. In some embodiments, options may be given to the user to further customize the image as will be described in more detail below.

As such, the user may be able to imagine or visualize an item that is aligned with the user's preferences such that the user may be encouraged to complete a transaction (e.g., purchase the item) and increase sales for the seller. Advantageously for both sellers and consumers, methods and systems according to one or more embodiments may provide specific or targeted recommendations, which may not be strictly based on what the user searches for or purchases at the time, via visual, customized images such that the user may be immersed in the transaction experience.

Figure 3B:
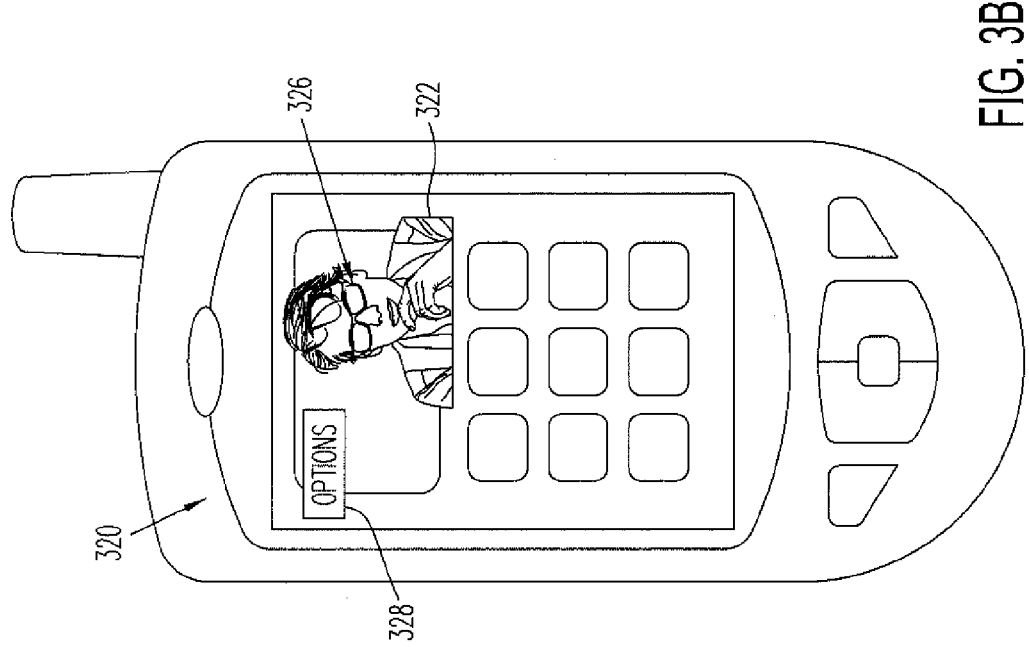
FIGS. 3A and 3B illustrate diagrams of a user device showing images according to an embodiment of the present disclosure.
Figure 3A:
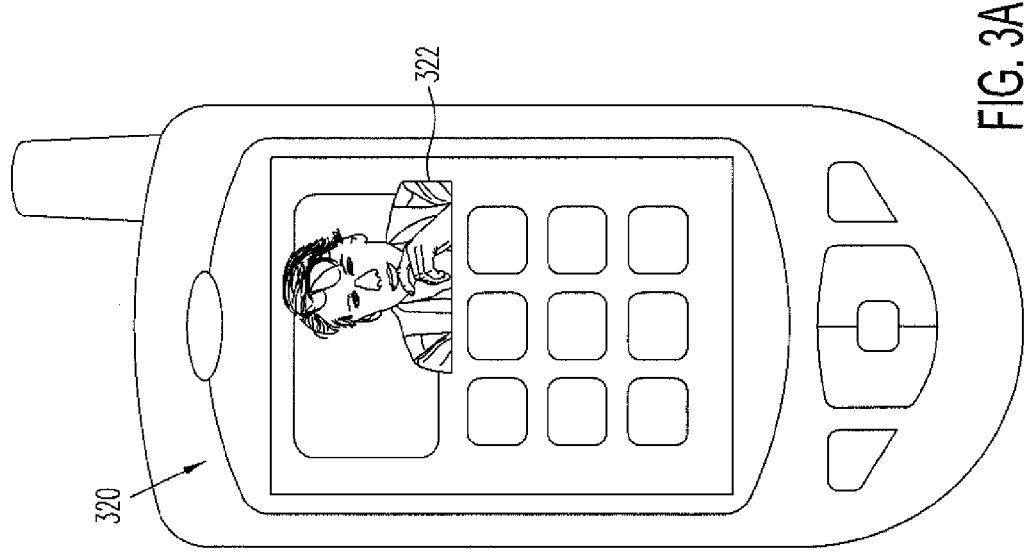

Referring to FIGS. 3A and 3B, a user device is illustrated showing images according to an embodiment of the present disclosure. It should be appreciated that the user device illustrated in FIGS. 3A and 3B may be implemented by user device 120 illustrated in the embodiment of FIG. 1.

In various embodiments, a user device 320 that is associated with a user (use or own) may include one or more applications having an image associated with such applications. For example, a user identifier (e.g., user identifier 130 illustrated in the embodiment of FIG. 1) may include one or more attributes related to the user such as personal information related to the user (e.g., photograph images, avatars, etc.). In the embodiment of FIG. 3A, an image 322 may be associated with an application of user device 320. In various embodiments, image 322 may be a picture of the user, an avatar, a picture of a model, or any other appropriate image. In various implementations, the user identifier including for example image 322 may be passed with a user login request to a remote location server (e.g. remote location server 180 via the network 160 illustrated in FIG. 1), and the user identifier may be used by the remote location server to associate the user with a particular user account maintained by the remote location server.

When the location of a user of user device 320 is determined, for example, the user is detected to enter a store, or to be near a store, or the user checks into a store such as an eyeglass store, an image of sunglasses 326 is automatically overlaid on image 322 and displayed on user device 320, as illustrated in the embodiment of FIG. 3B. In an embodiment, the image may also be shown to the seller upon the user checking in at the seller's place of business, for example. The overlaid image of sunglasses 326 may be the latest designer sunglasses offered by the eyeglass store and may reflect the kinds of things, characteristics or attributes the user may like, for example, the user's favorite brand, color and/or shape based on data such as the user's profile maintained at the remote location server. The image of sunglasses 326 may be overlaid on top of image 322, which may be an actual picture of the user, an avatar, a picture of a model, etc., and may enhance the user's buying experience by letting the user know the latest style of sunglasses available while taking into account one or more of the user's preferences (e.g., color), and giving the user an idea on how the item may look using his or her own picture or avatar, for example.

In various embodiments, a user-selectable interface 328, which may be labeled "Options" or have any other appropriate label, may provide information such as details or one or more options associated with an item shown on an overlaid image. For example, options for eyeglasses may be provided for the user to choose from such as other potential styles, colors, prescriptions, prices, gift cards, etc. as well as materials, origin, provenance (e.g. "made in . . ."), etc. The various options may be presented to the user upon selecting interface 328, for example, in the form of a list, a pop-up window, a text, an email, etc.

Furthermore, in embodiments where the user is detected to be nearby the seller or business location such as the eyeglass store, the location of the business or seller may be provided to the user, and in other embodiments, the location of other sellers offering the sunglasses may also be provided to the user. As such, if the user likes an overlaid item such as sunglasses and would like to purchase them, the user may find a business location where the user may find the item.

It should be noted that in embodiments where it is determined that the user is located at a business location such as an eyeglass store, or near an eyeglass store, other pertinent data may also be taken into account in recommending one or more items that may be displayed on the user's user device, for example, environmental data may be taken into account such as the weather being sunny, the time of year being Summer, etc. For example, image 322 may be accessorized based on the user's preferences or previous purchase history as well as the sunny weather, etc. such that a certain style of sunglasses to suit the user's preferences may be recommended and overlaid on image. 322.

In one or more embodiments, when the user's location is determined, an image on the user device may change based on where the user is located within the location. For example, when the user is determined to be in a store, an image on the user device may change based on where the user is within the store, for instance, the image may show sunglasses when the user is detected in a sunglasses portion or area of the store and changes to a suit when the user is detected in the men's suit section of the store. In another example, the image changes when the user is detected purchasing an item related to the image. In this case, if the user is shown an image of the user with sunglasses and then the user purchases sunglasses, the system may then change the image to remove the sunglasses and replace it with another item on the image.

Figure 4A:
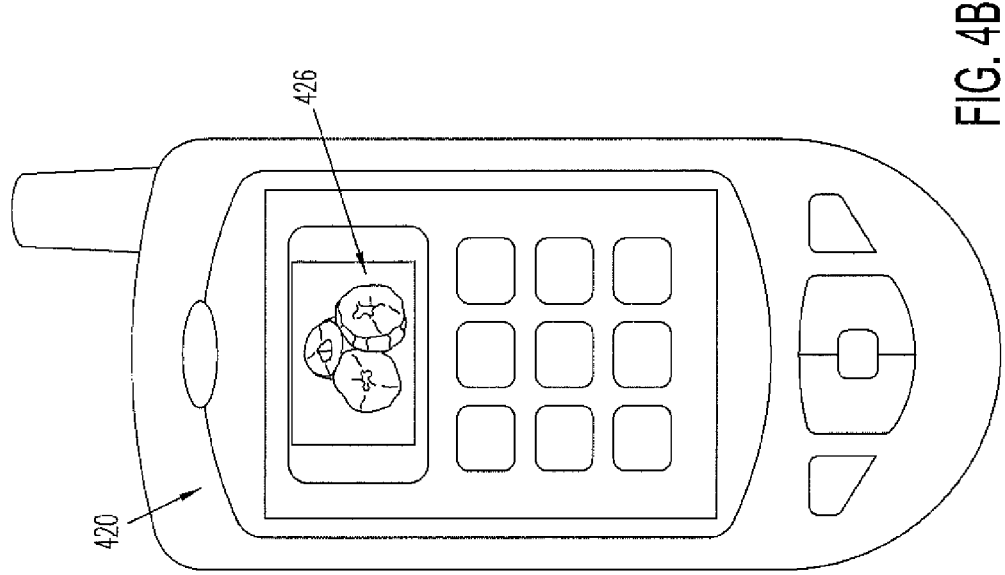
FIGS. 4A and 4B illustrate diagrams of a user device showing images according to another embodiment of the present disclosure.
Figure 4B:
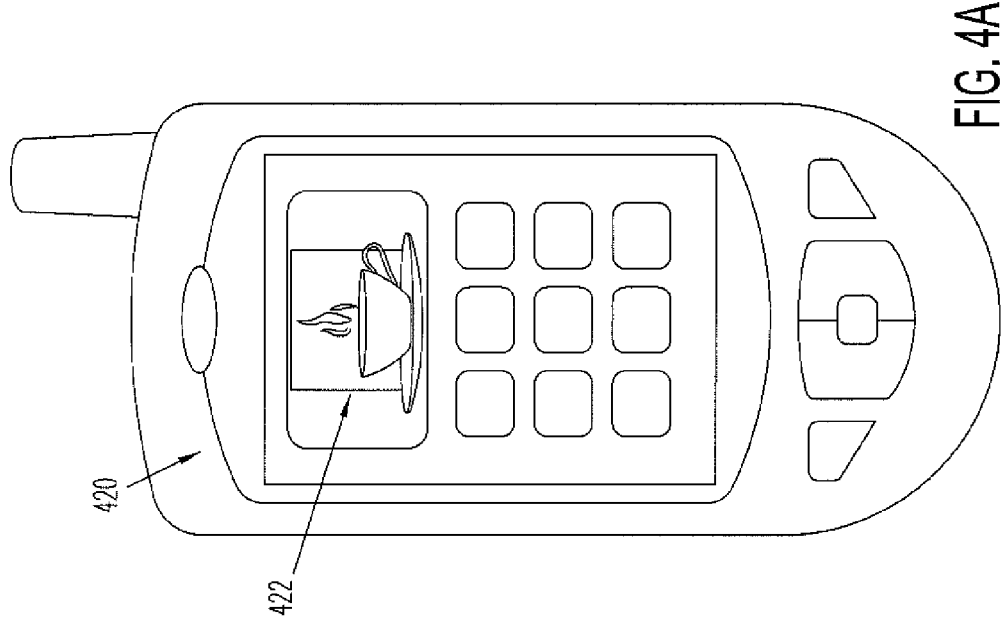

Referring now to FIGS. 4A and 4B, a user device is illustrated showing images according to another embodiment of the present disclosure. It should be appreciated that the user device illustrated in FIGS. 4A and 4B may be implemented by user device 120 illustrated in the embodiment of FIG. 1.

In various embodiments, a user device 420 that is associated with a user (use or own) may include one or more applications that may or may not have an image associated with such applications. For example, a user identifier (e.g., user identifier 130 illustrated in the embodiment of FIG. 1) may include one or more attributes related to the user such as personal information related to the user (e.g., a password, a name, etc., but not necessarily a user's photograph image). A user identifier including for example a password, a name, a pin, etc. may be passed with a user login request to a remote location server (e.g. remote location server 180 via the network 160 illustrated in FIG. 1), and the user identifier may be used by the remote location server to associate the user with a particular user account maintained by the remote location server.

In some embodiments, a user may not have an image or even an avatar associated with an application. In this case, a picture of an item itself, or a picture of the item on another person such as a model or another avatar may be used to display recommended items for the user. As such, although in one or more embodiments herein the user may upload a picture to realize more personal experiences, an actual picture of the user may not be necessary. Items or images may be changed or customized using a model or by themselves.

In the embodiment of FIG. 4A, when the user of user device 420 is detected to enter a store, or to be near a store, or the user checks into a store such as a coffee shop, an image of a coffee drink 422 may automatically appear on an interface or display of user device 420 based on, for example, the user's previous buying history and preferences for coffee (as opposed to cold drinks, for example). After a period of time, for example, after approximately 10 seconds, 20 seconds, 60 seconds, etc., the image may be changed so that an image of pastries 426 may automatically appear on user device 420, as illustrated in FIG. 4B. After another period of time, for example, after another 10 seconds, 20 seconds, etc., the image of pastries 426 may be changed again, and a further image, for example, fruit (not shown), may automatically appear on user device 420, and so on. The changing images may be tailored to the user according to data determined or inferred based at least on the user's profile including user preferences, previous purchase data, etc. As such, the user may be encouraged and be more likely to purchase one or more items as suggested by the customized images appearing on user device 420. Advantageously, this may result in more sales for the store.

In one or more embodiments, when a user's location is determined to be in a store such as the coffee shop, an image on the user device may change based on where the user is located within the store, for example, the image may show a coffee drink when the user is detected in a beverages portion or area of the store and changes to a coffee maker when the user is detected in the accessories section of the store. In another example, the image changes when the user is detected purchasing an item related to the image. In this case, if the user is shown an image of a coffee drink and then the user purchases a coffee drink, the system may then change the image to remove the coffee drink and replace it with another item on the image.

In various embodiments, an interface (not shown) on the user device may provide one or more "options" for various items offered by the coffee shop for the user to choose from such as other types of pastries, fruit, gift cards, prices, calories, allergens, etc. The various options may be presented to the user in various forms, for example, in the form of a list, a pop-up window, a text, an email, etc. Furthermore, in embodiments where the user is detected to be nearby the seller or business location such as the coffee shop, the location of the business or seller may be provided to the user, and in other embodiments, the location of other sellers such as other coffee shops or similar sellers may also be provided to the user.

In various embodiments, if a user decides to conduct a transaction, for example, purchase an item represented in a customized image (for example, sunglasses 326 illustrated in FIG. 3B), a convenient single-click access, for example, may be provided using a service provider such as PayPal®. Also, the application may provide easy access, e.g., single-click access, to view and bid on existing auctions such as eBay® auctions.

It should be noted that embodiments of the present disclosure may be applicable to many more situations. In various embodiments, background data may also be taken into account when changing or customizing images displaying recommended items for the user. For example, when a user books a hotel room, the image may change to reflect a picture of the hotel room in the background. An image such as a photograph of the user may be overlaid on the picture of the hotel room. As such, the user may imagine himself or herself as part of the hotel room background so that the user may easily imagine himself or herself being there. In another example, a photograph of the user may be overlaid on a garden background, or a beach background, for example, such that the user may imagine himself or herself being in a preferred vacation spot. This results in an enhanced transaction experience for the user.

Figure 5:
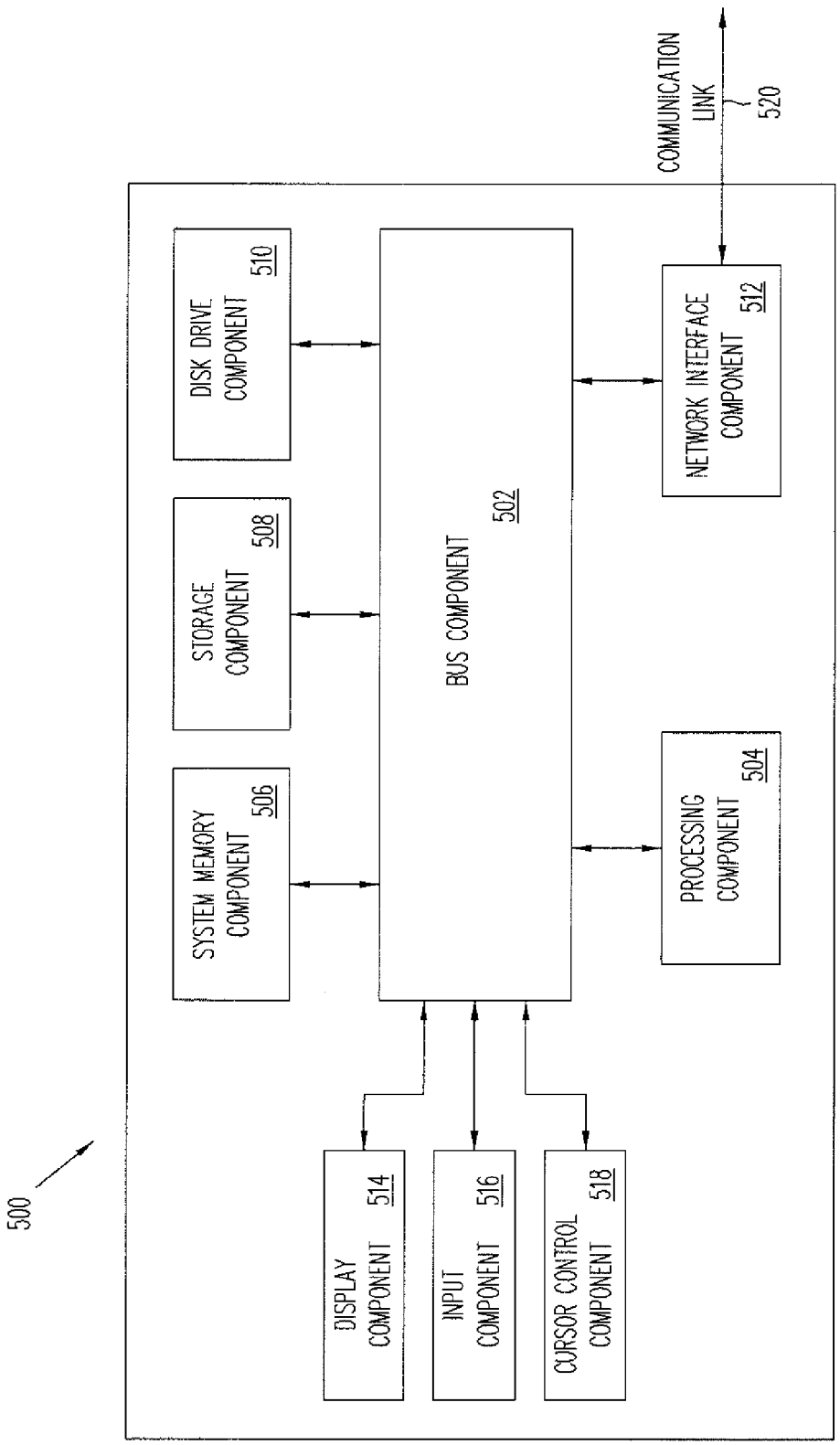
FIG. 5 shows a block diagram of a system suitable for implementing one or more embodiments of the present disclosure.

Referring now to FIG. 5, a block diagram of a system 500 is illustrated suitable for implementing embodiments of the present disclosure, including user device 120, one or more entity servers or devices 140, and remote location server or device 180. System 500, such as part of a cell phone, a smart phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad, keyboard, touchpad, voice input, etc.), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to present automatically customized images based on location data, a user profile, environmental data, background data, historical data, etc., process financial transactions, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 160 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for automatically changing or customizing images based on appropriate data to enhance a user's transaction experience.

Although various components and steps have been described herein as being associated with user device 120, entity server 140, and remote location server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 6:
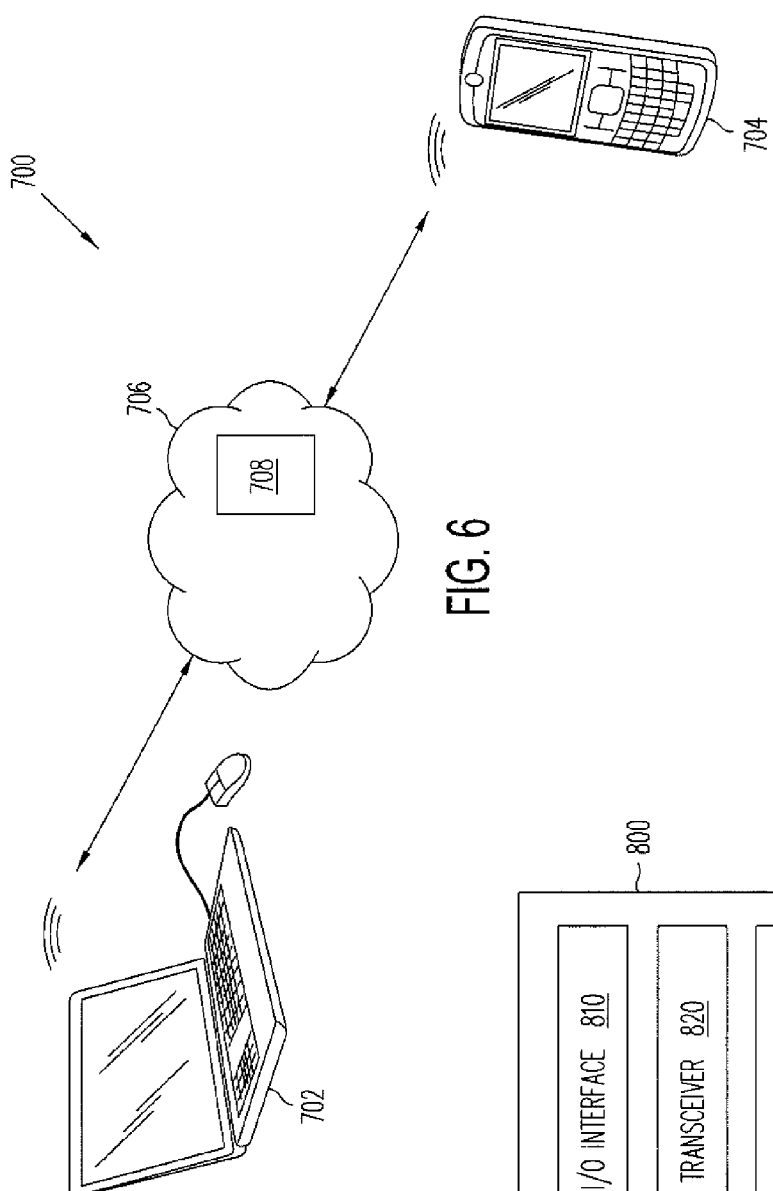
FIG. 6 illustrates an example of a cloud-based computing architecture, which may be used to implement various aspects of the present disclosure.

FIG. 6 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a user or consumer has the mobile device 704, which is configured to run software to provide an application with functionalities described above with reference to FIGS. 1-4.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an application on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating entity/merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, an entity/merchant or another user may access resources 708 from any number of suitable mobile or non-mobile devices. Furthermore, the cloud-based resources 708 may accommodate many merchants and users in various embodiments.

Figure 7:
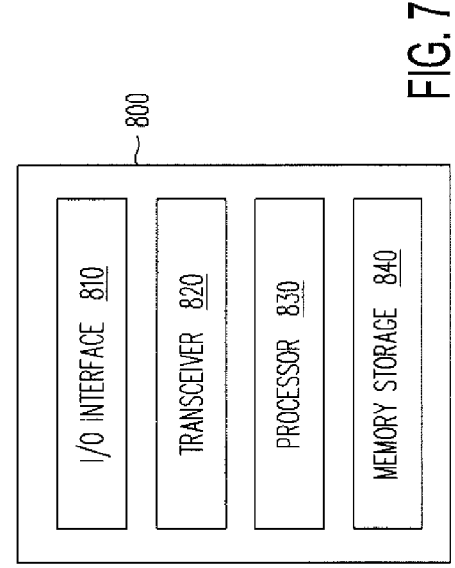
FIG. 7 is a simplified block diagram of an electronic system for facilitating electronic commerce.

FIG. 7 is a simplified block diagram of an electronic system 800 for facilitating electronic commerce. For example, the electronic system 800 may be used by a third party payment provider to carry out the steps for customizing images based on location, user data and/or other data as discussed herein. In some embodiments, the electronic system 800 may include one or more computer servers operable to perform the method illustrated in the embodiment of FIG. 2.

The electronic system 800 includes an input/output interface module 810. The interface module 810 is operable to receive an input from an external entity and communicate an output to the external entity. The external entity may include an entity/merchant or a user/consumer. In an embodiment, the input/output interface module 810 includes a visual display unit. The input/output interface module 810 may also include physical and/or virtual buttons, keyboards, mouse, track balls, speakers, microphones, light-sensors, light-emitting diodes (LEDs), communications ports (such as USB or HDMI ports), joy-sticks, image-capture devices (for example cameras), etc.

The electronic system 800 includes a transceiver module 820. The transceiver module 820 contains various electronic circuitry components configured to conduct telecommunications with one or more external devices. The electronic circuitry components allow the transceiver module 820 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the transceiver module 820 includes antennas, filters, low-noise amplifiers, digital-to-analog (DAC) converters, analog-to-digital (ADC) converters, and transceivers. The transceiver module 820 may further include circuitry components such as mixers, amplifiers, oscillators, phase-locked loops (PLLs), and/or filters. Some of these electronic circuitry components may be integrated into a single discrete device or an integrated circuit (IC) chip.

The electronic system 800 also includes a computer processor module 830 that is operable to execute computer instructions. The computer processor module 830 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code.

The electronic system 800 includes a memory storage module 840. The memory storage module 840 may contain various forms of digital memory, such as hard disks, FLASH, SRAM, DRAM, ROM, EPROM, memory chips or cartridges, etc. Computer programming code may be permanently or temporarily stored in the memory storage module 840, for example. The processor module 830 may be used to execute the computer programming code stored in the memory storage module 840.

The memory storage module 840 also contains a program module that is configured to facilitate transactions according to the present disclosure. For example, the program module operates to provide actions to customize images based on location, user profile and/or other appropriate data.

In some embodiments, the electronic system 800 may also be implemented on a portable electronic device such as a mobile telephone or a computer tablet.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although entity or merchant transactions have been described according to one or more embodiments, it should be understood that the present disclosure may also apply to transactions where requests for information, requests for access, or requests to perform certain other transactions may be involved.

Having thus described embodiments of the disclosure, persons of ordinary skill in the art will recognize that changes may be made in form and detail without departing from the scope of the disclosure. Thus the disclosure is limited only by the claims.

The invention claimed is:

1. A system comprising:
   a non-transitory memory; and
   one or more hardware processors coupled to the non-transitory memory and configured to cause the system to perform operations comprising:
      providing a user interface that display a likeness of a user on a device associated with the user;
      determining a first location of the device;
      accessing a profile of the user to determine item preferences of the user;
      automatically determining a first item for sale based on the item preferences, the first item being in proximity to the first location;
      automatically updating the user interface to display the first item for sale, wherein the displayed first item reflects item attributes preferred by the user and is overlaid on the likeness of the user;
      detecting that the user purchased the first item;
      in response to detecting that the user purchased the first item, updating the user interface to remove the first item;
      determining a second location of the device;
      automatically determining a second item for sale based on the item preferences, the second item being in proximity to the second location; and
      updating the user interface to display the second item for sale, wherein the displayed second item reflects item attributes preferred by the user and is overlaid on the likeness of the user.

2. The system of claim 1, wherein the user profile further comprises at least one of user preferences, user tastes, user's previous transaction data or behaviors of the user, user searches, and user-entered data.

3. The system of claim 1, wherein the user interface further comprises a background based on the first item.

4. The system of claim 1, wherein the operations further comprise providing one or more options to the user for customizing the first item or the second item on the user interface.

5. The system of claim 1, wherein the operations further comprise providing, on the user interface, a location of a merchant offering the first item or the second item for sale.

6. A method comprising:
providing a user interface that displays a likeness of a user on a device of a user;
determining, electronically by a processor, a first location of the device;
accessing a profile of the user to determine item preferences of the user;
automatically determining a first item for sale based on the item preferences, the first item being in proximity to the first location;
automatically updating the user interface to display the first item for sale, wherein the displayed first item reflects item attributes preferred by the user and is overlaid on the likeness of the user;
detecting that the user purchased the first item;
in response to detecting that the user purchased the first item, updating the user interface to remove the first item;
determining a second location of the device;
automatically determining a second item for sale based on the item preferences, the second item being in proximity to the second location; and
updating the user interface to display the second item for sale, wherein the displayed second item reflects item attributes preferred by the user and is overlaid on the likeness of the user.

7. The method of claim 6, wherein determining the first location, the second location, or both comprises at least one of receiving check in data from the device via a social network site, location data from a beacon, and mobile check-in data from the device.

8. The method of claim 6, further comprising customizing the user interface based on environmental data comprising at least one of weather, time of year, and time of day.

9. The method of claim 6, further comprising customizing a background of the user interface based on the first item.

10. A non-transitory computer-readable medium having stored thereon machine-readable instructions executable to cause a machine to perform operations comprising:
providing a user interface that displays a likeness of a user on a device associated with a user;
determining a first location of the device;
accessing a profile of the user to determine item preferences of the user;
automatically determining a first item for sale based on the item preferences, the first item being in proximity to the first location;
automatically updating the user interface to display the first item for sale, wherein the displayed first item reflects item attributes preferred by the user and is overlaid on the likeness of the user;
detecting that the user purchased the first item;
in response to detecting that the user purchased the first item, updating the user interface to remove the first item;
determining a second location of the device;
automatically determining a second item for sale based on the item preferences, the second item being in proximity to the second location; and
updating the user interface to display the second item for sale, wherein the displayed second item reflects item attributes preferred by the user and is overlaid on the likeness of the user.

11. The system of claim 1, wherein the operations further comprise determining environmental conditions and customizing the user interface based on the environmental conditions.

12. The system of claim 1, wherein the first location and the second location are within a single merchant store.

13. The system of claim 1, wherein the operations further comprise providing, to a merchant, an image of the first item or the second item overlaid on the likeness of the user.

14. The method of claim 6, further comprising providing one or more options to the user for customizing the first item or the second item on the user interface.

15. The method of claim 6, further comprising providing, on the user interface, a location of a merchant offering the first item or the second item for sale.

16. The non-transitory computer-readable medium of claim 10, wherein the operations further comprise providing one or more options to the user for customizing the first item or the second item on the user interface.

17. The non-transitory computer-readable medium of claim 10, wherein the operations further comprise providing, on the user interface, a location of a merchant offering the first item or the second item for sale.

18. The non-transitory computer-readable medium of claim 10, wherein the first location and the second location are within a single merchant store.

19. The non-transitory computer-readable medium of claim 10, wherein the operations further comprise determining environmental conditions and customizing the user interface based on the environmental conditions.

20. The non-transitory computer-readable medium of claim 10, wherein the operations further comprise providing, to a merchant, an image of the first item or the second item overlaid on the likeness of the user.

* * * * *

UNITED STATES PATENT AND TRADEMARK OFFICE
CERTIFICATE OF CORRECTION

PATENT NO. : 9,503,845 B2
APPLICATION NO. : 14/255840
DATED : November 22, 2016
INVENTOR(S) : Sundar Amalan Vincent Page 1 of 1

It is certified that error appears in the above-identified patent and that said Letters Patent is hereby corrected as shown below:

In the Specification

In Column 5, Line 4, change "which, may" to --which may--.

In Column 9, Line 25, change "image. 322" to --image 322--.

In the Claims

In Column 14, Line 38, change "display" to --displays--.

In Column 14, Line 62, remove "user" and "further".

In Column 14, Line 63, remove "user's".

Signed and Sealed this
Twenty-first Day of February, 2017

Michelle K. Lee
*Director of the United States Patent and Trademark Office*